United States Patent
Uchida et al.

(10) Patent No.: US 7,674,026 B2
(45) Date of Patent: Mar. 9, 2010

(54) LAMP SYSTEM FOR A VEHICLE

(75) Inventors: Daisuke Uchida, Tokyo (JP); Toshiyuki Kondo, Tokyo (JP)

(73) Assignee: Stanley Electric Co., Ltd., Tokyo (JP)

(*) Notice: Subject to any disclaimer, the term of this patent is extended or adjusted under 35 U.S.C. 154(b) by 0 days.

(21) Appl. No.: 11/563,766

(22) Filed: Nov. 28, 2006

(65) Prior Publication Data

US 2007/0127256 A1 Jun. 7, 2007

(30) Foreign Application Priority Data

Dec. 6, 2005 (JP) ............................. 2005-352191

(51) Int. Cl.
*F21S 8/10* (2006.01)
(52) U.S. Cl. ...................... 362/545; 362/540
(58) Field of Classification Search ................ 362/487, 362/493, 498, 499, 507, 540, 541, 542, 543, 362/544, 545, 800; 340/426.23, 426.35, 340/426.36; 307/9.1, 10.1–10.8
See application file for complete search history.

(56) References Cited

U.S. PATENT DOCUMENTS

| | | | |
|---|---|---|---|
| 4,808,968 A | * | 2/1989 | Caine ........................ 340/479 |
| 4,868,542 A | * | 9/1989 | Thompson .................. 340/468 |
| 4,868,719 A | | 9/1989 | Kouchi et al. |
| 5,896,010 A | * | 4/1999 | Mikolajczak et al. ......... 315/77 |
| 5,969,603 A | * | 10/1999 | Wang ......................... 340/471 |
| 6,250,788 B1 | * | 6/2001 | Muller ....................... 362/541 |
| 6,520,669 B1 | * | 2/2003 | Chen et al. .................. 362/545 |
| 6,714,128 B2 | * | 3/2004 | Abbe et al. ................. 340/468 |
| 6,867,692 B2 | * | 3/2005 | Weatherspoon ............. 340/479 |
| 6,897,771 B1 | * | 5/2005 | Lodhie et al. ............... 340/479 |
| 2003/0012034 A1 | * | 1/2003 | Misawa et al. .............. 362/545 |

FOREIGN PATENT DOCUMENTS

| | | |
|---|---|---|
| EP | 0326668 | 8/1989 |
| JP | 1197141 | 8/1989 |

* cited by examiner

*Primary Examiner*—John A Ward
(74) *Attorney, Agent, or Firm*—Cermak Kenealy Vaidya & Nakajima LLP

(57) ABSTRACT

A vehicle lamp can include LEDs configured to be a light source of the lamp, where the LEDs can be controlled to be turned on in part or in whole for a predetermined period and in a configuration that is different from the originally intended display purpose configuration of the lamp. The configuration can be controlled to be different when the vehicle is stopped and when a driver (or other person) initiates a predetermined operation on the vehicle. Contents such as color and pattern that are displayed by the LEDs on this occasion can be different from the contents associated with the original display purpose configuration of the vehicle lamp, resulting in an additional new display function, and new design.

19 Claims, 4 Drawing Sheets

US 7,674,026 B2

LAMP SYSTEM FOR A VEHICLE

BACKGROUND

This application claims the priority benefit under 35 U.S.C. § 119 of Japanese Patent Application No. 2005-352191 filed on Dec. 6, 2005, which is hereby incorporated in its entirety by reference.

1. Field

The presently disclosed subject matter relates to a lamp system for a vehicle, and more particularly relates to a configuration of a lamp system for a vehicle that uses LEDs for the lamp's light source.

2. Description of the Related Art

FIGS. 3, and 4 show an example of a stop lamp 91 for a conventional vehicle lamp which is configured to change a turn-on pattern configuration. When a driver starts to depress a brake pedal 90 as shown in FIG. 3, a turn-on portion 91a appears as a narrow area at the center of the stop lamp 91 which includes LEDs arranged as a matrix, for example, as shown in FIG. 4.

When the driver further depresses the brake pedal 90, the number of LEDs which are turned on increases in proportion to the depressing force, resulting in an increase of the turn-on area 91a of the stop lamp 91. Thus, a driver of a following vehicle can recognize that the brake is applied harder on the lead vehicle based on the increased light emitting area of the stop lamps of the lead vehicle.

Then, if the driver of the lead vehicle further depresses the brake pedal 90, almost the entire surface of the stop lamp 91 emits light to form the turn-on area 91a, and the driver of the following vehicle can easily understand that the lead vehicle is in a full braking state, which allows the following driver to take corresponding measures such as application of full braking or the like. (See, Japanese Unexamined Patent Publication (Kokai) No. H01-197141, for example.)

Furthermore, there is proposed a turn signal lamp which turns on as a bright and dark stripe pattern, and the bright and dark stripe pattern moves as a vehicle makes a turn to more clearly notify a following vehicle and the like of the turn direction of the lead vehicle.

However, in the above-described conventional configurations, the stop lamp 91, for example, is intended to improve the brake light display for more clarity to a third person. Therefore, in a normal traveling state, the driver of the lead vehicle behaves as the driver of the following vehicle expects such as starting to depress the brake pedal 90 at a proper position according to a traffic signal at an intersection.

Thus, if an unexpected operation such an emergency braking is necessary, according to the conventional art devices, the light emitting area is increased as the depressed stroke of the brake pedal 90 increases, the mechanical travel speed of the brake pedal 90 remains the same, and there is thus generated a slight delay until the stop lamp 91 entirely turns on even if LED lamps, which have a fast response, are used as a light source.

Moreover, it is still necessary to consider whether the intended behaviors of the lead vehicle are fully understood by other vehicles, namely, whether communication is sufficient by means of lamps such as tail lamps, stop lamps, turn signal lamps, and backup lamps, which are presently equipped on a vehicle. Further, design of vehicle lamps has become stale as viewed by a following vehicle.

SUMMARY OF THE DISCLOSED SUBJECT MATTER

According to one aspect of the presently disclosed subject matter, a lamp for a vehicle can include a combination of multiple LEDs that are used as a light source. The multiple LEDs of the lamp can in part or in whole turn on for a predetermined period and in a configuration that is different from an original display purpose configuration of the lamp if the vehicle is stopped or if it is appropriate to use the lamp at a particular time to communicate differently from its original communication purpose. For example. when a driver initiates a predetermined operation for the vehicle, the vehicle lamp LEDs can be turned on in a configuration different from the lamp's original display purpose configuration to communicate a message or warning that is different from the original display purpose configuration of the lamp.

According to the presently disclosed subject matter, a new display such as a display to notify neighboring vehicles of an intention to start a vehicle can be realized without increasing the number of lamps. This effect can be realized by turning on rear combination lamps such as tail lamps, stop lamps, and/or turn signal lamps (or, possibly, front combination lamps) for a predetermined period in a turn-on pattern. The turn on communication pattern can be different from the standard display pattern(s) typically used for the respective lamps, and can occur upon use of an ignition key or the like while the vehicle is stopped.

DETAILED DESCRIPTION OF EXEMPLARY EMBODIMENTS

Figure 1:
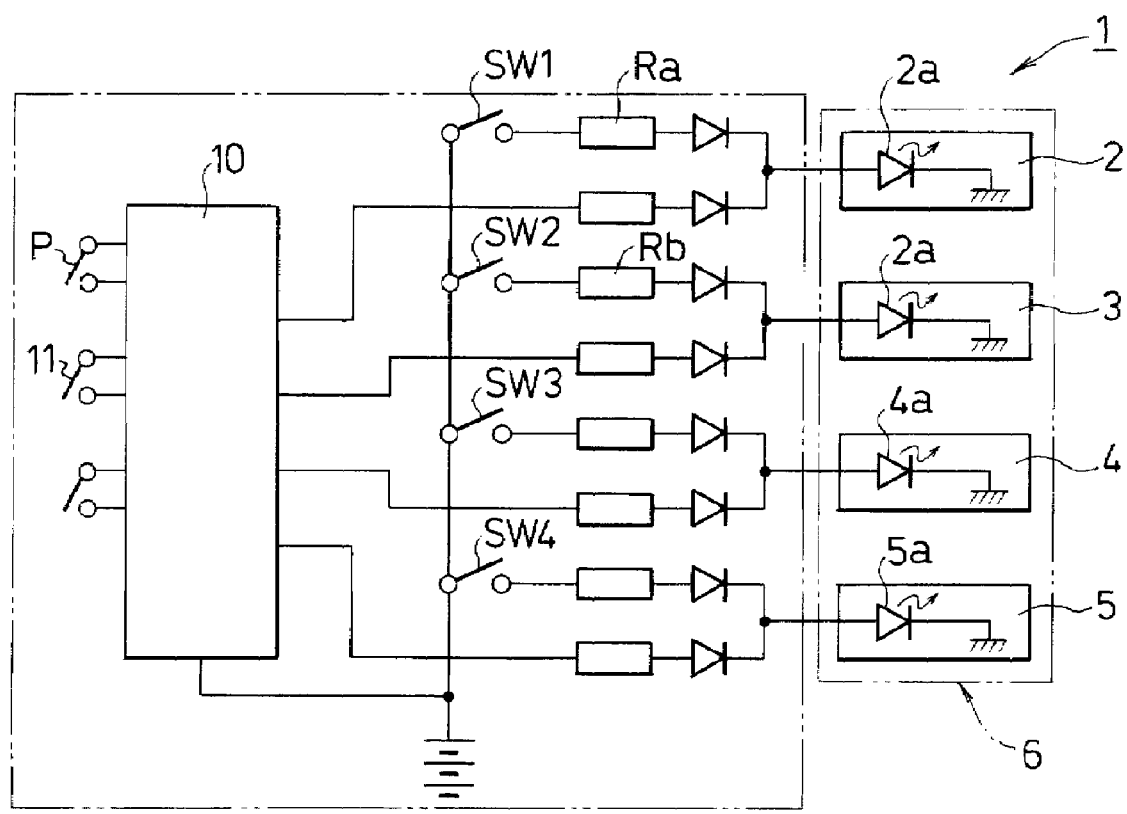
FIG. 1 is a schematic circuit diagram showing an embodiment of a vehicle lamp made in accordance with principles of the presently disclosed subject matter.

A detailed description will now be given of exemplary embodiments of the presently disclosed subject matter with reference to drawings. FIG. 1 is a circuit diagram showing an overall configuration of a vehicle lamp 1 made in accordance with principles of the presently disclosed subject matter, and the vehicle lamp 1 herein is a rear combination lamp 6 including a tail lamp 2, a stop lamp 3, a turn signal lamp 4, and a backup lamp 5, which are combined together.

It should be noted that the tail lamp 2 and the stop lamp 3 can have the same lamp color, and can provide different displays only by changing the brightness thereof. Of course, the colors of the different lamps can be different, and should be selected in accordance with various regulations and laws of a particular country. The tail lamp 2 and the stop lamp 3 may be unified, and may provide different displays which can be distinguished by a viewer by means of different supply currents. Moreover, if a country of destination for a vehicle has a regulation which requires the tail lamp 2 and the stop lamp 3 to be different in color, they may be formed independently.

The presently disclosed subject matter may be realized in multiple embodiments. A description will be given of a configuration of a lamp that is realized without largely changing the construction of the rear combination lamp 6 as shown in FIG. 1, and in which the tail lamp 2 and the stop lamp 3 can have the same emitted light color, while configured independently.

According to the embodiment shown in FIG. 1, an LED 2a, which is a light source of the tail lamp 2, and which emits red light, is connected to a power supply via a switch SWI. A light source of the stop lamp 3 can also be configured to emit light in the same color, and can employ the LED 2a, which is also used as the light source for the tail lamp 2.

Since the tail lamp 2 and the stop lamp 3 can be different in brightness as described above, a current-limit resistor Ra for the tail lamp 2, which is serially connected to the LED 2a, and a current-limit resistor Rb, which supplies current to the stop lamp 3 if the pedal switch SW2 is turned on, can be different in resistance. The stop lamp 3 can be turned on with a predetermined and multiple amount of brightness characteristics for the tail lamp 2 if a brake pedal is depressed to turn on the pedal switch SW2.

Similarly, a proper number of LEDs 4a emitting orange light can be installed as a light source in the turn signal lamp 4. The LEDs 4a can be controlled to flicker at a predetermined interval on a side corresponding to a direction of a turn by a driver's operation of a turn signal lever (SW3). The reverse or backup lamp 5, which is turned on by a reverse switch SW4 associated with the vehicle's transmission, employs an LED 5a which emits white or yellow light as a light source, for example.

A control unit 10 can be added to the above configuration, and the control unit 10 can be configured to turn on at least two types of lamp(s) such as the stop lamp 3 and the turn signal lamp 4 of the rear combination lamp 6.

It should be noted that the rear combination lamp 6 is usually installed symmetrically on a left side end and a right side end of the vehicle, and the control unit 10 may control either or both of the rear combination lamps 6.

Moreover, if the control unit 10 controls both of the rear combination lamps 6, the control unit 10 may provide the left and right rear combination lamps 6 with symmetrical control, asymmetrical control, which controls the turn signal lamp 4 on one side and the tail lamp 2 on the other side, for example, or random control. Further, the control unit 10 may drive lamps of a front combination lamp such as a front turn signal lamp, a front position lamp, headlamp, emergency signal lamps, spot lamps, etc.

In addition, according to the embodiment of FIG. 1, the control unit 10 provides outputs to the above respective lamps only when a predetermined specific operation, such as operation of an ignition key 11, is carried out on the vehicle. The control unit 10 can be operational only when an automatic transmission is in the P (parking) position, or when a manual transmission is in the neutral position. If the transmission is shifted to a position for driving the vehicle, the control unit 10 can be configured to stop operation thereof, and the respective lamps can then follow their originally intended operation(s) when their corresponding turn-on switch(es) are operated.

In the vehicle lamp 1 according to the embodiment of FIG. 1 configured as described above, if the driver operates the ignition key 11 to start the engine while the vehicle is in park, or operates a transmitter for keyless entry, or carries out other operations, all or part of the lamps of the rear combination lamp 6, and/or all or a part of the lamps of the front combination lamp, can be turned on. The control unit 10 can be configured to turn on the lamps in a configuration that is different from the configuration in which they are turned on for their originally intended purpose and for a certain period. For example, the control unit 10 can intermittently turn on the tail lamp 2 if the tail lamp 2 is the lamp to be turned on.

Alternatively, the tail lamp 2, the stop lamp 3, the turn signal lamp 4, and the backup lamp 5 may repeatedly be turned on in this sequence on the rear combination lamp 6, or the respective lamps can flash completely at random between the left and right rear combination lamps 6.

In brief, it is only necessary for a viewer to clearly recognize that the respective lamps 2 to 5 are turned on in a configuration that is different from the original display purpose configuration. This operational state for the lamps can provide a new display with the limited number of lamps (without requiring additional communication lamps). Furthermore, the lamps can be controlled to provide a unique display in order to locate the driver's own vehicle among a large number of other parked vehicles, for example, in an indoor parking area of a large shopping store, an outdoor parking area of a large amusement park, or the like.

When the vehicle starts traveling, the operation of the control unit 10 can be configured to cease operation, and the respective lamps 2 to 5 then provide their originally intended functions, so as not to pose a problem such as a safety problem during traveling. It is apparent that the same functions and effects can also be provided using the front combination lamps.

Furthermore, if there is a vehicle that is flickering respective lamps in a configuration that is different from the originally intended purpose(s) thereof (for example, in a dark indoor parking area with relatively insufficient illumination), a viewer can easily expect that an owner of the vehicle is close to the vehicle, and that the vehicle is likely to be started soon, which is also extremely effective in terms of accident prevention.

Figure 2:
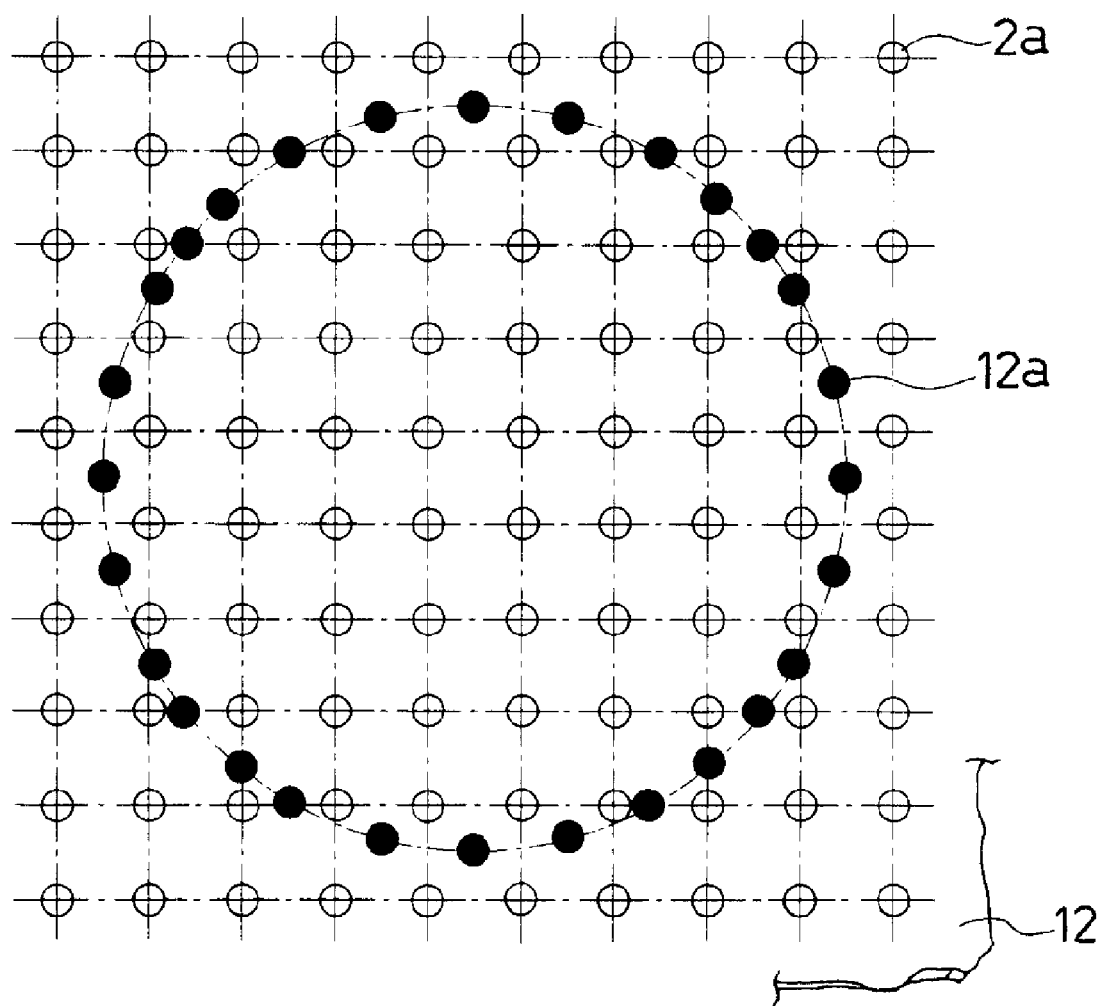
FIG. 2 depicts a portion of another embodiment of a vehicle lamp made in accordance with principles of the presently disclosed subject matter.
Figure 3:
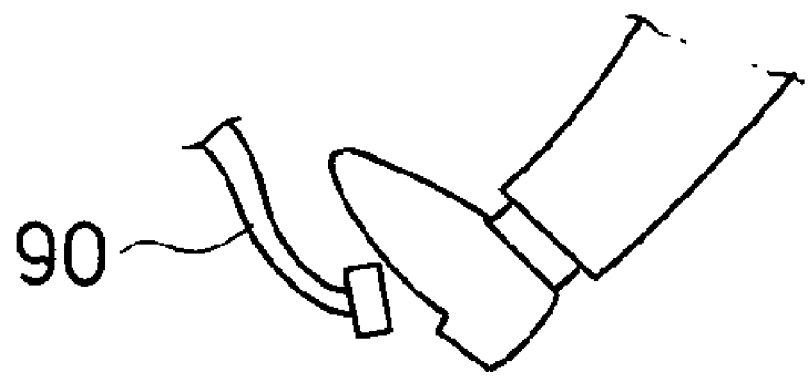
FIG. 3 depicts operation states of a brake pedal according to a conventional example.
Figure 3:
Figure 3:
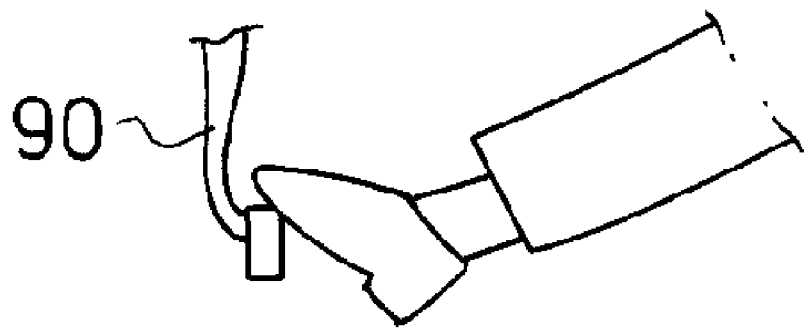
Figure 4:
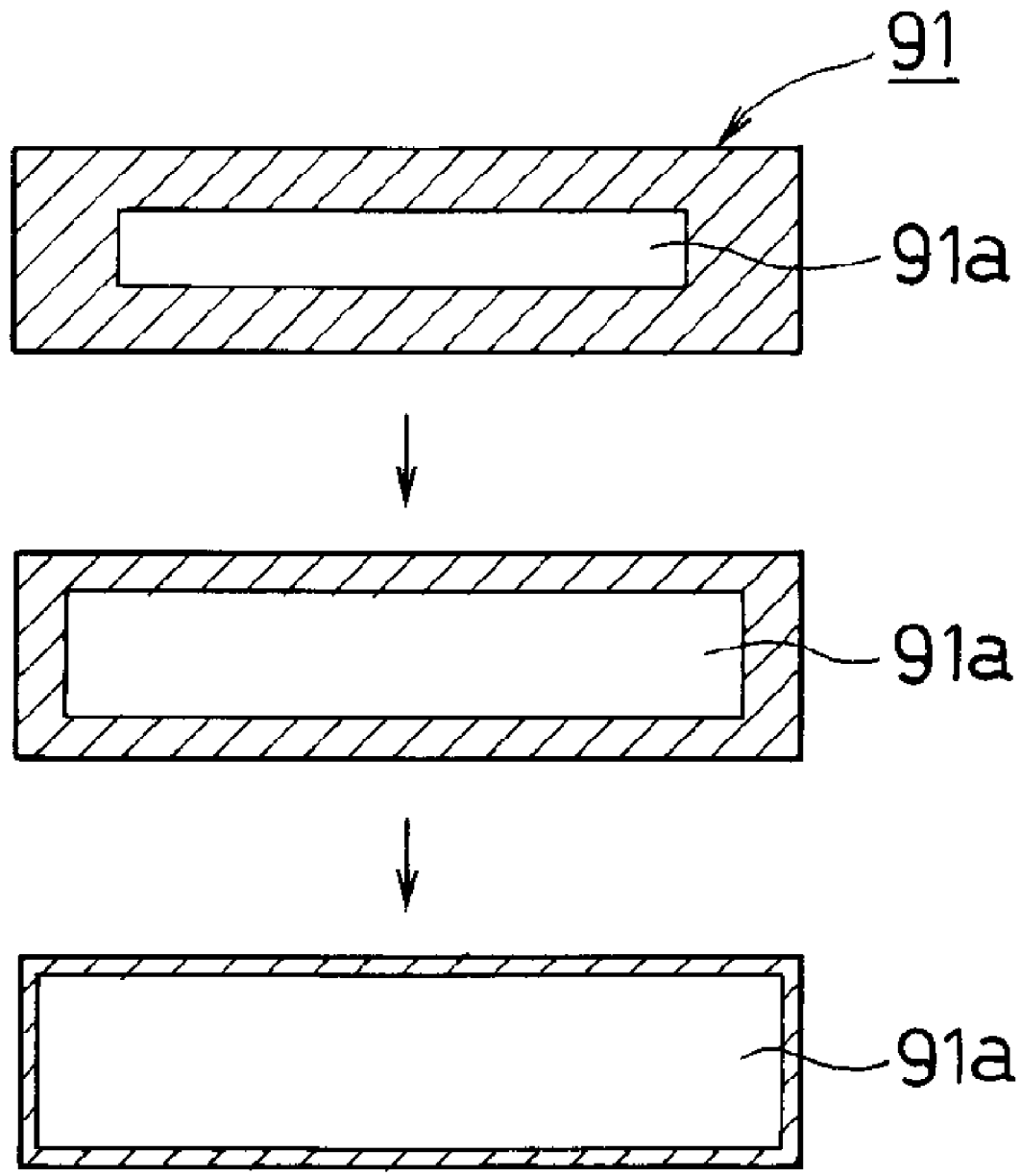
FIG. 4 depicts changing states of a light emitting area of a stop lamp according to the operation states shown in FIG. 3.

FIG. 2 shows a another embodiment of a vehicle lamp 1 made in accordance with principles of the presently disclosed subject matter. Blue is not usually permitted for use as a color for a vehicle lamp. However, in the vehicle lamp 1 according to the presently disclosed subject matter, since the control unit 10 can turn off LED's which are not required for use during travel of the vehicle, the LEDs 2a which emit red light, which is a color regulated by law, and LEDs 12a which emit blue light represented as circles filled in black in FIG. 2 can be mounted in arbitrary proportion, number, and arrangement on a circuit board 12 for the tail lamp 2. Thus, the tail lamp 2 may emit blue light in a ring shape from the start of the engine to the start of the vehicle, for example, resulting in an innovative and novel vehicle lamp in terms of design. Of course, other colors or combinations of colored LEDs can be used in the above described vehicle light, and other shapes and sizes can be used for the matrix of lamps that are turned on to provide different communications.

The embodiments described above may be combined such that the tail lamp 2 or the like may flash in blue until start of a vehicle. The presently disclosed subject matter provides such advantages that a new function can be added without substantially changing the configuration of conventional vehicle lamps, and the vehicle lamp 1 having an unprecedented novel design can be realized.

While there has been described what are at present considered to be exemplary embodiments of the invention, it will be understood that various modifications may be made thereto, and it is intended that the appended claims cover such modifications as fall within the true spirit and scope of the invention.

What is claimed is:

1. A lamp system for use in a vehicle comprising:
at least one vehicle lamp including a plurality of light emitting diodes (LEDs) that are combined to form a light source that has at least an original display configuration and to emit light for outside of the vehicle; and
a control unit,
wherein the control unit provides outputs to the plurality of LEDs of the at least one vehicle lamp are turned on in whole or in part for a predetermined period and in a first display configuration that is different from the original display configuration of the at least one vehicle lamp while the vehicle is stopped or when a shift position for an automatic transmission of the vehicle is in park or when a shift position for a manual transmission of the vehicle is in neutral or when the vehicle is initiated by a predetermined operation ;
wherein the control unit stops operation for turning on the plurality of LEDs in the first display configuration when the shift position of the automatic transmission of the vehicle or the shift position of the manual transmission of the vehicle is shifted to a position for driving the vehicle or when the vehicle starts traveling.

2. The lamp system for use in a vehicle according to claim 1,
wherein the at least one vehicle lamp includes a plurality of vehicle lamps each including the plurality of LEDs that are combined to form the light source that has at least one original display configuration to emit light for outside of the vehicle;
wherein the first display configuration is a predetermined sequence of turning on, a random turning on, a symmetrical turning on or an asymmetrical turning on of each of the plurality of vehicle lamps or a random-flash.

3. The lamp system for use in a vehicle according to claim 1, wherein a purpose of a portion of the plurality of LEDs that are turned on in the first display configuration is to provide a first communication that is different from a communication associated with the original display configuration.

4. The lamp system for use in a vehicle according to claim 1, wherein a purpose of a portion of the plurality of LEDs that are turned on in the first display configuration is to provide a first communication that is different from a communication associated with the original display configuration that is provided by a second portion of the plurality of LEDs.

5. The lamp system for use in a vehicle according to claim 1,
wherein the at least one vehicle lamp is a front combination lamp or a rear combination lamp.

6. The lamp system for use in a vehicle according to claim 1, wherein the plurality of LEDs comprises a first set of LEDs and a second set of LEDs being different from the first set of LEDs;
wherein the first set of LEDs is turned on in the original display configuration, and the second set of LEDs is turned on in the first display configuration.

7. The lamp system for use in a vehicle according to claim 1, wherein a first color of light emitted by the plurality of LEDs in the first display configuration is different from a second color of light emitted by the plurality of LEDs in the original display configuration, or a first brightness of light emitted by the plurality of LEDs.

8. A method for using the lamp system of claim 1 comprising:
providing a vehicle with at least brakes, turn signals, and the lamp system of claim 1;
causing at least a portion of the plurality of LEDs to be turned on in the original display configuration when an operator initiates at least one of the brakes and the turn signals; and
causing the portion of the plurality of LEDs to be turned on in the first configuration that is different from the original display configuration while the vehicle is stopped and when the operator initiates a function other than initiating one of the brakes, the turn signals.

9. A method for using the lamp system of claim 8 wherein the first configuration includes turning on the at least a portion of the plurality of LED lamps in a different shape as compared to a shape of the original display configuration.

10. A method for using the lamp system of claim 8 wherein the first configuration includes turning on the at least a portion of the plurality of LED lamps to exhibit a different color as compared to a color of the original display configuration.

11. The lamp system for use in a vehicle according to claim 1, further comprising;
a first circuit connected to a first portion of the plurality of LEDs that are configured to be turned on in the first display configuration; and
a second circuit connected to a second portion of the plurality of LEDs that are configured to be turned on in the original display configuration.

12. The lamp system for use in a vehicle according to claim 11, wherein the first portion of the plurality of LEDs provided on the first circuit emits light different in color from the second portion of the plurality of LEDs that are turned on in the original display configuration.

13. The lamp system for use in a vehicle according to claim 12, wherein a purpose of the first portion of the plurality of LEDs that are turned on in the first display configuration is to provide a first communication that is different from a communication associated with the original display configuration.

14. The lamp system for use in a vehicle according to claim 11, wherein a purpose of the first portion of the plurality of LEDs that are turned on in the first display configuration is to provide a first communication that is different from a communication associated with the original display configuration that is provided by the second portion of the plurality of LEDs.

15. A lamp system for use in a vehicle comprising:
a control unit including a switch movable between an on position and an off position such that when a shift position of an automatic transmission of the vehicle is in park or when a shift position of a manual transmission of the vehicle is in a neutral, the switch is in the on position, and when the shift position of the automatic transmission is different from park or when the shift position of the manual transmission is different from neutral, the switch is in the off position,
at least one vehicle lamp, the at least one vehicle lamp including,
a plurality of LEDs that form a light source for the vehicle lamp, wherein
the control unit is configured to provide a first control signal to at least a first portion of the plurality of LEDs when the switch is in the off position such that the at least first portion of the plurality of LEDs operates in a normal operation mode, and the control unit is also configured to provide a second control signal to at least a second portion of the plurality of LEDs only when the vehicle is stopped and the switch is in the on position and when the vehicle is initiated by an ignition key or a transmitter for a keyless entry such that the at least second portion of the plurality of LEDs operates in a first operation mode that is different from the normal operation mode, wherein the control unit stops providing the second control signal to the at least second portion of the plurality of LEDs when the switch is in the off position or when the vehicle starts traveling such that the at least second portion of the plurality of LEDs is turned off during travel of the vehicle.

16. The lamp system for use in a vehicle according to claim 15, wherein the at least one vehicle lamp includes a plurality of vehicle lamps each including the plurality of LEDs that are combined to form the light source that has at least the normal operation mode and to emit light for outside of the vehicle;

wherein the first operation mode is a predetermined sequence of turning on, a random turning on, a symmetrical turning on or an asymmetrical turning on of each of the plurality of vehicle lamps or a random-flash.

17. The lamp system for use in a vehicle according to claim 15, wherein the control unit includes a first circuit connected to the first portion of the plurality of LEDs, and a separate circuit different from the first circuit and connected to the second portion of the plurality of LEDs.

18. The lamp system for use in a vehicle according to claim 17, wherein the second portion of the plurality of LEDs provided on the separate circuit emits light different in color from the first portion of the plurality of LEDs.

19. The lamp system for use in a vehicle according to claim 15, wherein the first portion of the plurality of LEDs is different from the second portion of the plurality of LEDs.

* * * * *